(12) United States Patent
Zambito (10) Patent No.: US 12,128,511 B2
(45) Date of Patent: Oct. 29, 2024

(54) APPARATUS AND METHOD FOR POSITIONING A SAFETY STRAP

(71) Applicant: Christopher Matthew Zambito, Triadelphia, WV (US)

(72) Inventor: Christopher Matthew Zambito, Triadelphia, WV (US)

( * ) Notice: Subject to any disclaimer, the term of this patent is extended or adjusted under 35 U.S.C. 154(b) by 382 days.

(21) Appl. No.: 17/583,796

(22) Filed: Jan. 25, 2022

(65) Prior Publication Data

US 2022/0234153 A1 Jul. 28, 2022

Related U.S. Application Data

(60) Provisional application No. 63/141,141, filed on Jan. 25, 2021.

(51) Int. Cl.
| | |
|---|---|
| *B25B 9/00* | (2006.01) |
| *B23P 19/04* | (2006.01) |
| *B25J 1/02* | (2006.01) |
| *F16F 1/02* | (2006.01) |

(52) U.S. Cl.
CPC ............... *B23P 19/04* (2013.01); *B25B 9/00* (2013.01); *B25J 1/02* (2013.01); *F16F 1/025* (2013.01)

(58) Field of Classification Search
CPC ............ B25B 25/00; B25B 33/00; B25B 9/00; B25B 9/02; B25B 9/04; B25J 1/02; B65B 13/345; E01H 1/12
See application file for complete search history.

(56) References Cited

U.S. PATENT DOCUMENTS

| | | | | |
|---|---|---|---|---|
| 3,625,084 | A * | 12/1971 | Low ........................ | F16C 1/00 248/278.1 |
| 4,253,697 | A * | 3/1981 | Acosta ..................... | B25J 1/02 294/111 |
| 5,647,622 | A * | 7/1997 | Schectman .............. | B25J 1/02 294/111 |

\* cited by examiner

*Primary Examiner* — Tyrone V Hall, Jr.
(74) *Attorney, Agent, or Firm* — Eckert Seamans Cherin & Mellott, LLC (57) ABSTRACT

An apparatus for positioning a strap around an object includes a handle for being grasped by a user of the apparatus. The apparatus further includes an arm portion having a first end coupled to the handle portion and an opposite second end having a coupling mechanism coupled at or nearby for selectively coupling a portion of the strap to the second end of the arm portion. When the handle portion is grasped by the user of the apparatus adjacent a side of the object the arm portion is sized and configured to be movable among: a first positioning wherein the arm portion extends outward from the handle and the user such that the second end of the arm portion extends a distance beyond a far side of the object, and a second positioning wherein the arm portion wraps at least partially around the object.

10 Claims, 10 Drawing Sheets

APPARATUS AND METHOD FOR POSITIONING A SAFETY STRAP

CROSS-REFERENCE TO RELATED APPLICATIONS

This patent application claims the priority benefit under 35 U.S.C. § 119(e) of U.S. Provisional Application No. 63/141,141, filed on Jan. 25, 2021, the contents of which are herein incorporated by reference.

FIELD OF THE INVENTION

The present invention relates to an apparatus for use in positioning a strap around a structure, such as, for example, without limitation, a safety strap around a structure such as a pole or tree. The present invention further relates to a method of using such an apparatus for positioning a strap or similar item around a structure.

BACKGROUND OF THE INVENTION

There are several occasions where straps are needed to be placed around objects or structures. For example, safety straps positioned around vertical poles or similar structures are commonly used by utility workers. Similarly, hunters and/or other nature observers occupying elevated tree stands commonly use safety straps positioned around vertical or near vertical portions of the trunk or large branches near the trunk of the tree. Unlike utility poles which are of known/fixed diameters, the diameters of trees used by hunters/observers can vary greatly and can commonly be several feet. Typically such straps are installer by a person generally slinging one end of the strap around the structure/object and catching the end in the other hand. The type/size of the strap, height of the placement, diameter of the structure/object, effects of gravity, weather conditions, branches, etc. can all adversely affect attempts to successfully install such straps. Accordingly, there exists a need for solutions for placing/locating such straps in repeatable, predictable, and safe manners.

SUMMARY OF THE INVENTION

Embodiments of the present invention address shortcomings of the art and provide a variety of benefits over existing solutions. As one aspect of the present invention, an apparatus for positioning a strap around an object is provided. The apparatus comprises: a handle portion sized and configured to be grasped by a user of the apparatus; an arm portion having a first end and an opposite second end, the first end being coupled to the handle portion; and a coupling mechanism coupled at or near the second end of the arm portion, the coupling mechanism being structured to selectively couple a portion of the strap to the second end of the arm portion, wherein, when the handle portion is grasped by the user of the apparatus adjacent a side of the object, the arm portion is sized and configured to be movable among: a first positioning wherein the arm portion extends outward from the handle and the user such that the second end of the arm portion extends a distance beyond a far side of the object, and a second positioning wherein the arm portion wraps at least partially around the object.

When in the second positioning the arm portion may wrap at least 180° around the element.

The arm portion may be movable among a third positioning wherein the arm portion is rolled back toward the handle portion in a spiral-like positioning adjacent the handle.

The object may be a portion of a tree, and the arm portion may be sized and configured to be disposed in the second positioning about the tree.

The arm portion may comprise a single integral member that extends from the first end to the opposite second end of the arm portion. The integral member may comprise a strip of bi-stable material.

The arm portion may comprise a plurality of segments pivotably coupled together in a series arrangement, wherein each segment is coupled to a preceding segment by a first pivotable coupling arranged about a first pivot axis, wherein each segment is coupled to a proceeding segment by a second pivotable coupling arranged about a second pivot axis, and wherein the first pivot axis and second pivot axis are spaced a distance from each other. The distance between the first pivot axis and the second pivot axis of each segment of the plurality of segments may be the same. The distance between the first pivot axis and the second pivot axis of at least two segments of the plurality of segments may be different. The apparatus may further comprise a retraction cord having a first end coupled at or about the second end of the arm portion and an opposite second end, wherein the retraction cord extends along, and interacts with the plurality of segments in a manner such that when the cord is tensioned by a user pulling on the second end of the cord, the arm portion is moved to a third positioning wherein the arm portion is rolled back toward the handle position in a spiral-like positioning adjacent the handle. The retraction cord may extend through the plurality of segments. The retraction cord may extend through a portion of the handle. The retraction cord may further comprises a securement arrangement that fixes the retraction cord with respect to the handle and thus fixes the arm portion in the third positioning. The second end of the retraction cord may comprises a loop sized and configured to fit around the wrist of a user of the apparatus.

The coupling mechanism may comprise a spring biased clamping arrangement.

The coupling mechanism may comprise a single u-shaped piece of flexible material.

As another aspect of the present invention, a method of positioning a strap around an object using an apparatus is provided. The apparatus comprising: a handle portion sized and configured to be grasped by a user of the apparatus; an arm portion having a first end and an opposite second end, the first end being coupled to the handle portion; and a coupling mechanism coupled at or near the second end of the arm portion, wherein, when the handle portion is grasped by the user of the apparatus adjacent a side of the object, the arm portion is sized and configured to be movable among: a first positioning wherein the arm portion extends outward from the handle and the user such that the second end of the arm portion extends a distance beyond a far side of the object, and a second positioning wherein the arm portion wraps at least partially around the object is provided. The method comprises: coupling a portion of the strap to the second end of the arm portion via the coupling mechanism; moving the arm portion to the first positioning if not already in such positioning prior to coupling the portion of the strap; positioning the arm portion adjacent the side of the object; moving the arm portion from the first positioning to the second positioning; and uncoupling the portion of the strap from the second end of the arm portion.

The arm portion may be movable among a third positioning wherein the arm portion is rolled back toward the handle portion in a spiral-like positioning adjacent the handle, and the method may further comprise: moving the arm member from the third positioning to the first positioning prior to coupling the portion of the strap to the second end of the arm portion via the coupling mechanism. The method may further comprise moving the arm member from the second positioning to the third positioning after uncoupling the portion of the strap from the second end of the arm portion.

The apparatus may further comprise a retraction cord having a first end coupled at or about the second end of the arm portion and an opposite second end, and moving the arm member from the second positioning to the third positioning after uncoupling the portion of the strap from the second end of the arm portion may comprise pulling the second end of the cord.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION OF EXEMPLARY EMBODIMENTS

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs.

As used herein, "directly coupled" means that two elements are coupled in direct contact with each other without any intermediary elements.

As used herein, "fixedly coupled" or "fixed" means that two components are coupled so as to move as one while maintaining a constant orientation relative to each other.

As used herein, the word "unitary" means a component is created as a single piece or unit. That is, a component that includes pieces that are created separately and then coupled together as a unit is not a "unitary" component or body.

As used herein, the statement that two or more parts or components "engage" one another shall mean that the parts exert a force against one another either directly or through one or more intermediate parts or components.

As used herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The present invention will now be described, for purposes of explanation, in connection with numerous specific details in order to provide a thorough understanding of the subject invention. It will be evident, however, that the disclosed concept can be practiced without these specific details or with various combinations thereof without departing from the spirit and scope of this innovation.

Referring to FIGS. 1A, 1B, 2A, 2B, 3A and 3B, a schematic representation of an apparatus 10 for use in positioning a strap 24 (FIGS. 3A and 3B) around a structure/object 26 (also shown schematically in FIGS. 3A and 3B) in accordance with one example embodiment of the present invention is shown. For example, apparatus 10 may be employed by a hunter in a tree stand to position a safety strap around a tree in which the stand is positioned. As another example, apparatus 10 may be employed by a utility worker to place a safety strap around a utility pole that is being serviced by the utility worker. It is to be generally appreciated that apparatus 10 may be employed to position any strap or similar item generally around any object without varying from the scope of the present invention.

Apparatus 10 includes a handle portion 12 that is sized and configured to be grasped in the hand of a user (not shown). Handle portion 12 may be formed from any suitable material or materials (e.g., wood, plastic, composite, etc.) and may include any suitable structures or formations for assisting a user in gripping thereof without varying from the scope of the present invention. Apparatus 10 further includes an arm portion 14 extending from handle portion 12. Arm portion 14 includes a first end 16 coupled to handle portion 12 and an opposite second end 18. A coupling mechanism 20 is coupled (e.g., via any suitable arrangement) at or about second end 18. As shown schematically in FIGS. 3A and 3B, coupling mechanism 20 is structured to engage with a portion 22 of strap 24 in a manner such that portion 22 is coupled to arm portion 14 at or about second end 18 thereof. In example embodiments of the present invention spring biased clamping mechanisms (e.g., similar to a clothespin or chip clip for closing a foil bag of potato chips) as well as clamping mechanisms formed from a single u-shaped piece of material (e.g., similar to a belt clip on a measuring tape). It is to be appreciated, however, that any suitable coupling mechanism/arrangement may be employed without varying from the scope of the present invention.

Figures 1A, 1B:
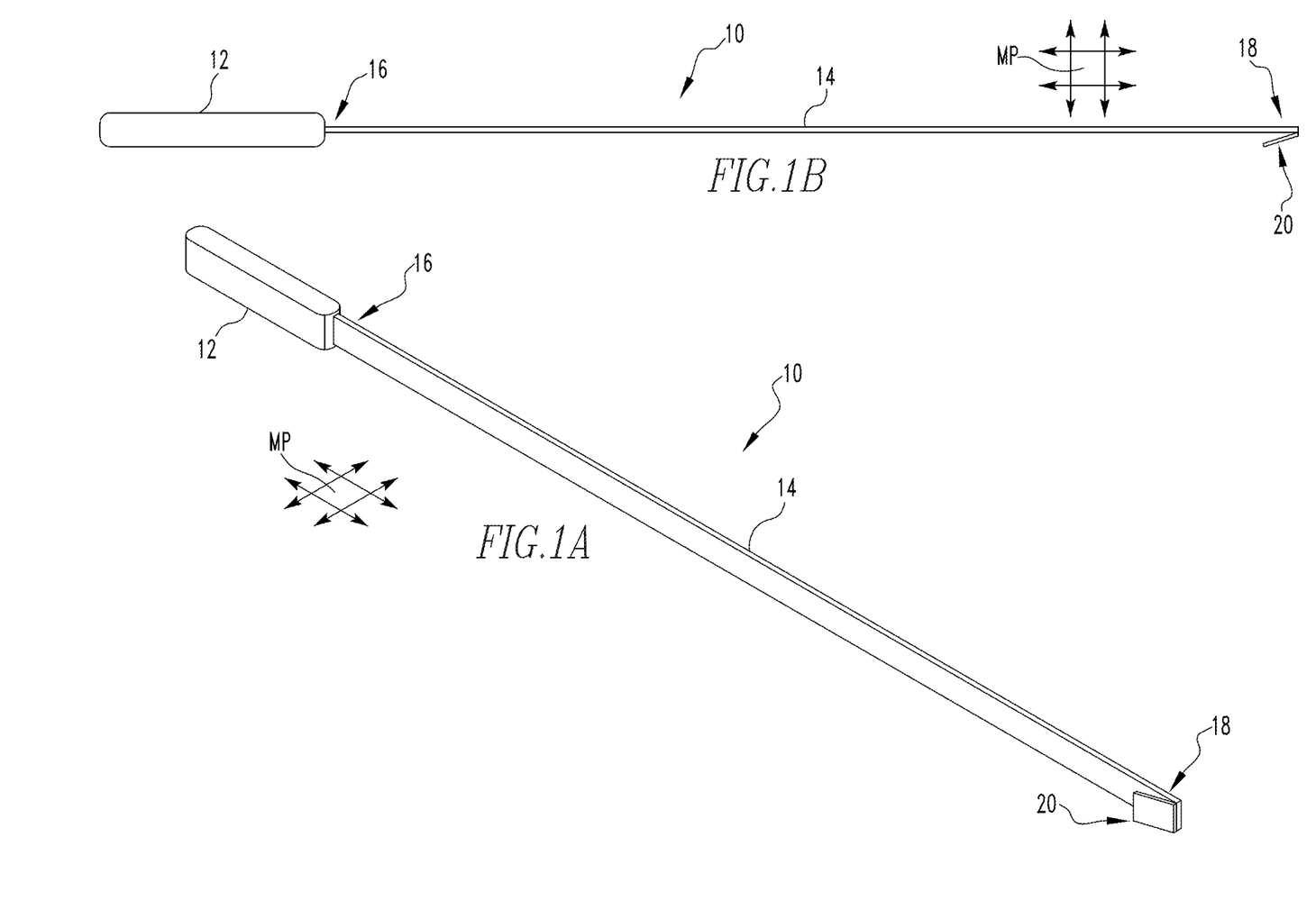
FIG. 1A is a perspective view of a schematic representation of an apparatus for use in positioning a strap in accordance with one example embodiment of the present invention shown with an arm portion thereof positioned in a first, extended positioning.
FIG. 1B is a top view of the schematic representation of the apparatus of FIG. 1A.
Figure 2A:
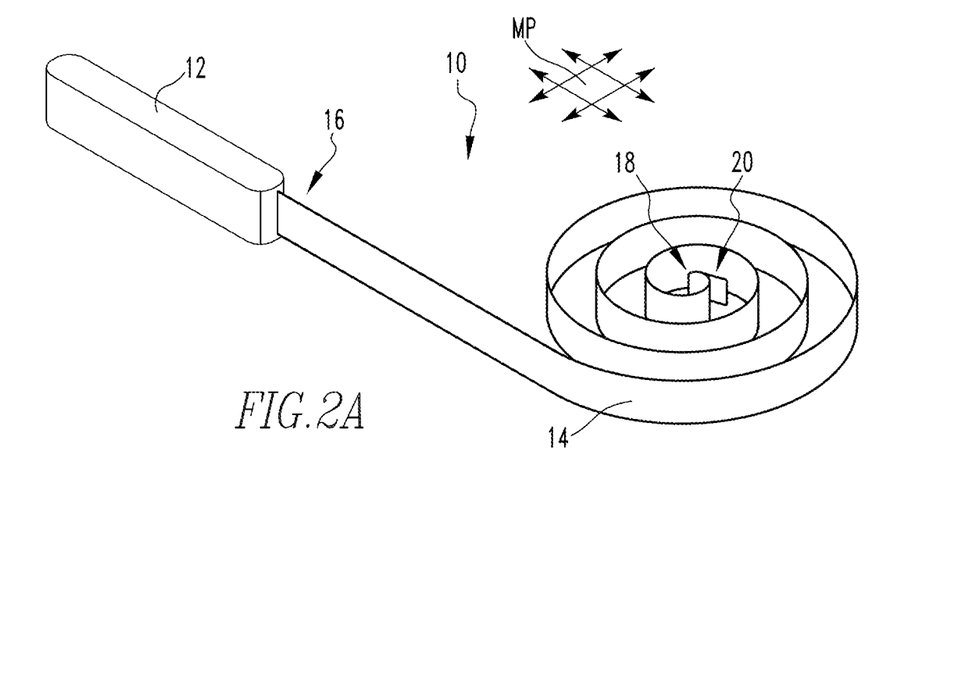
FIG. 2A is another perspective view of the schematic representation of the apparatus of FIG. 1A shown with the arm portion thereof positioned in a second, retracted positioning in accordance with one example embodiment of the present invention.
Figure 2B:
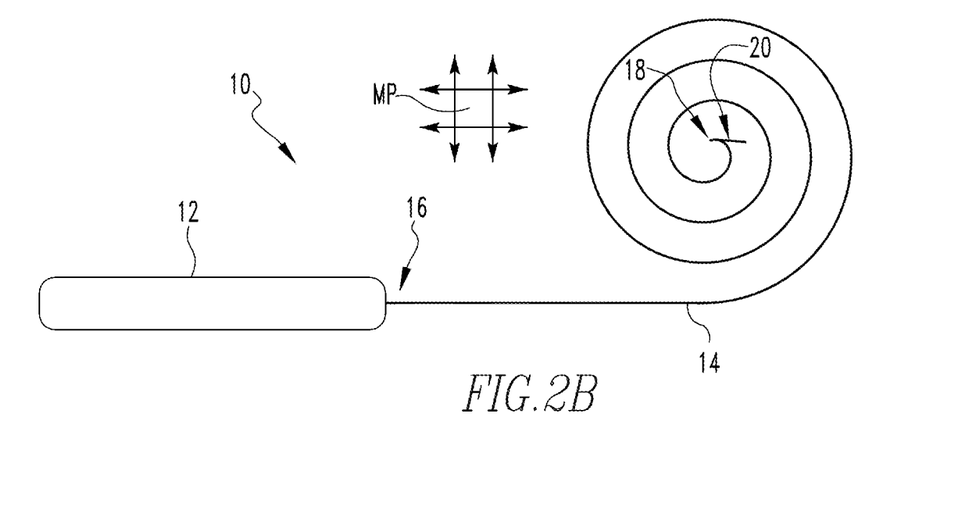
FIG. 2B is a top view of the schematic representation of the apparatus of FIG. 2A.
Figure 3A:
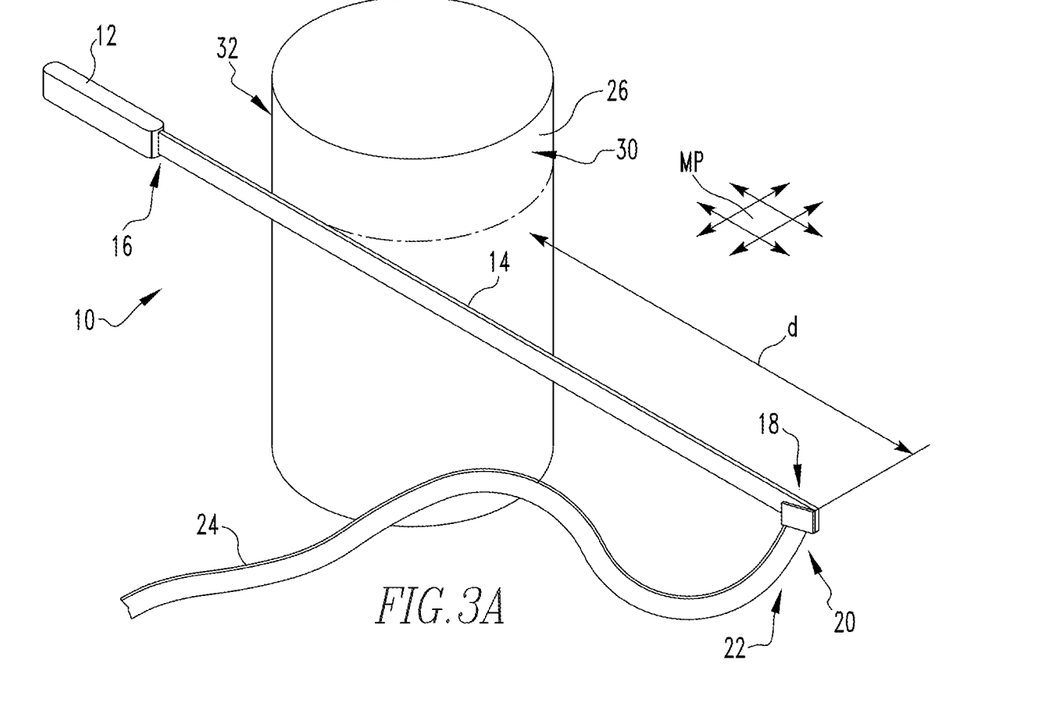
FIG. 3A is a perspective view of an arrangement including the schematic representation of the apparatus of FIGS. 1A, 1B, 2A and 2B shown with the arm portion thereof positioned in the first, extended positioning adjacent a vertical element with the end of a strap secured to an end of the arm portion in accordance with one example embodiment of the present invention.
Figure 3B:
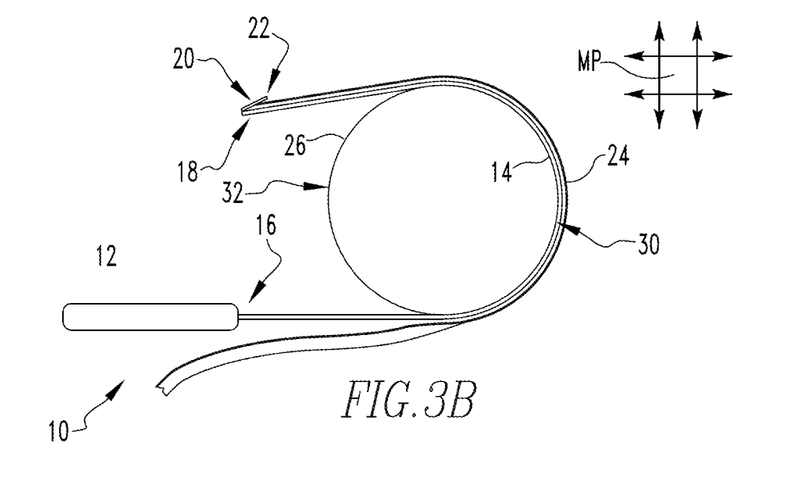
FIG. 3B is a top view of the arrangement of FIG. 3A.
Figures 4, 5, 6:
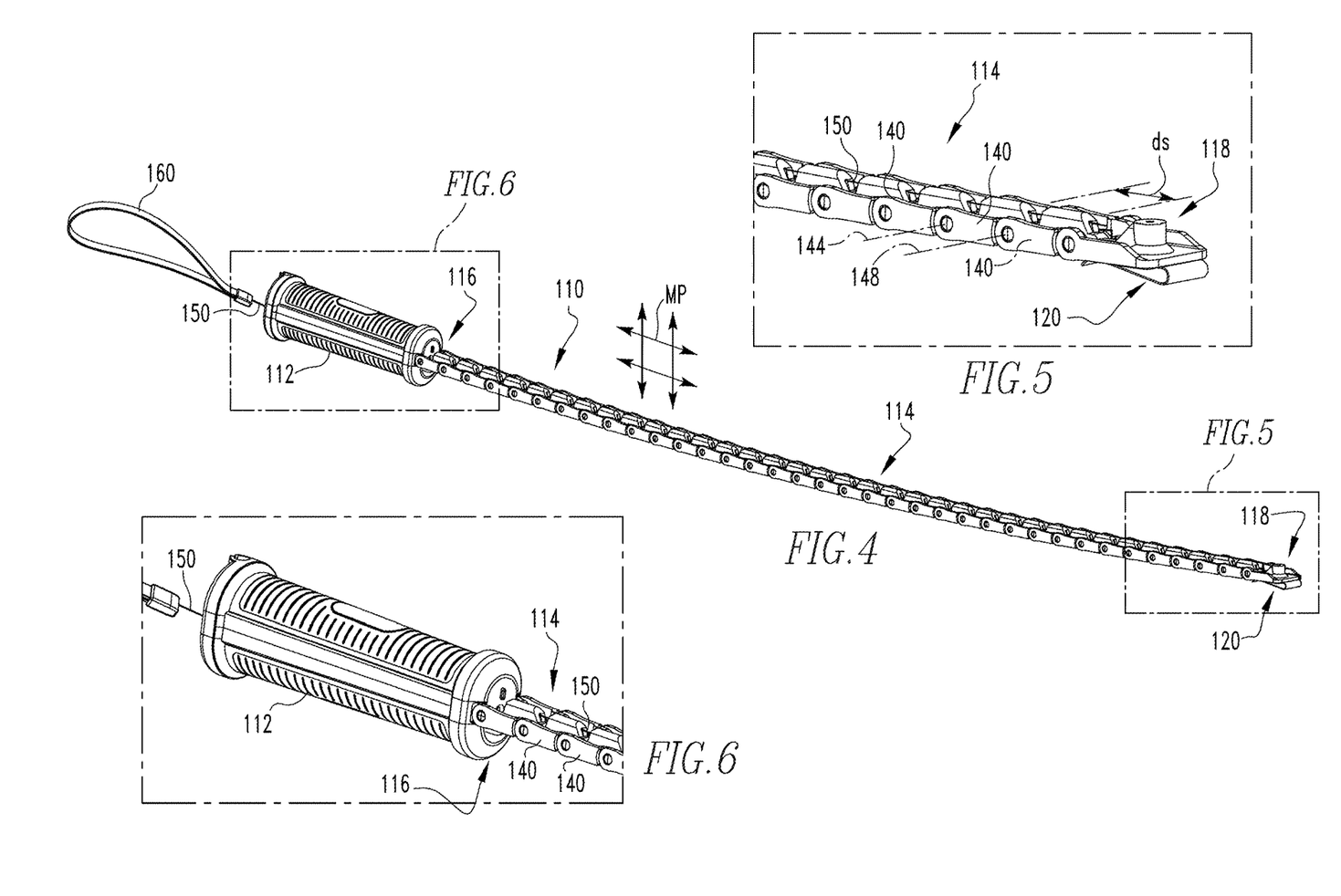
FIG. 4 is a perspective view of an apparatus for use in positioning a strap in accordance with another example embodiment of the present invention shown with an arm portion thereof positioned in a first, extended positioning.
FIGS. 5 and 6 are detail views of the portions of the apparatus of FIG. 4 indicated therein.
Figure 7:
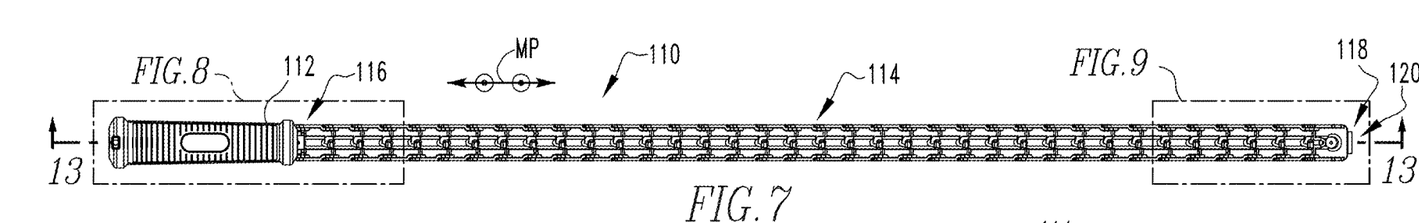
FIG. 7 is a top view of the apparatus of FIG. 4.
Figure 8:
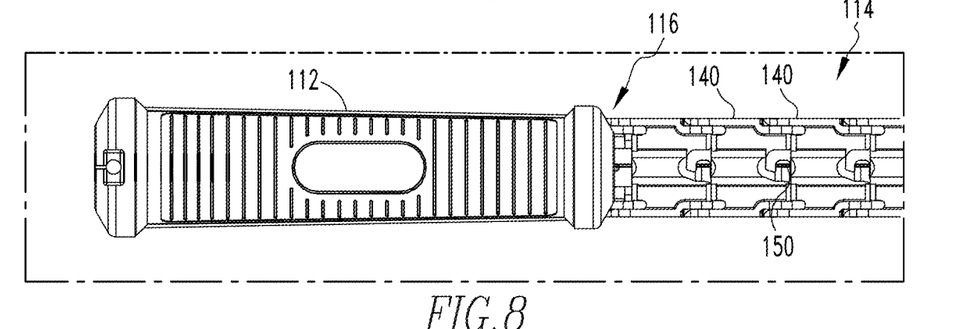
FIGS. 8 and 9 are detail views of the portions of the apparatus of FIG. 7 indicated therein.
Figure 9:
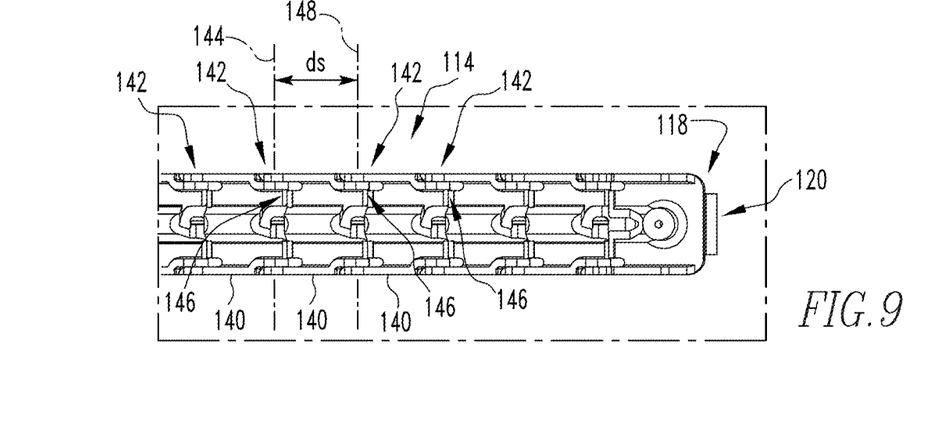
Figure 10:
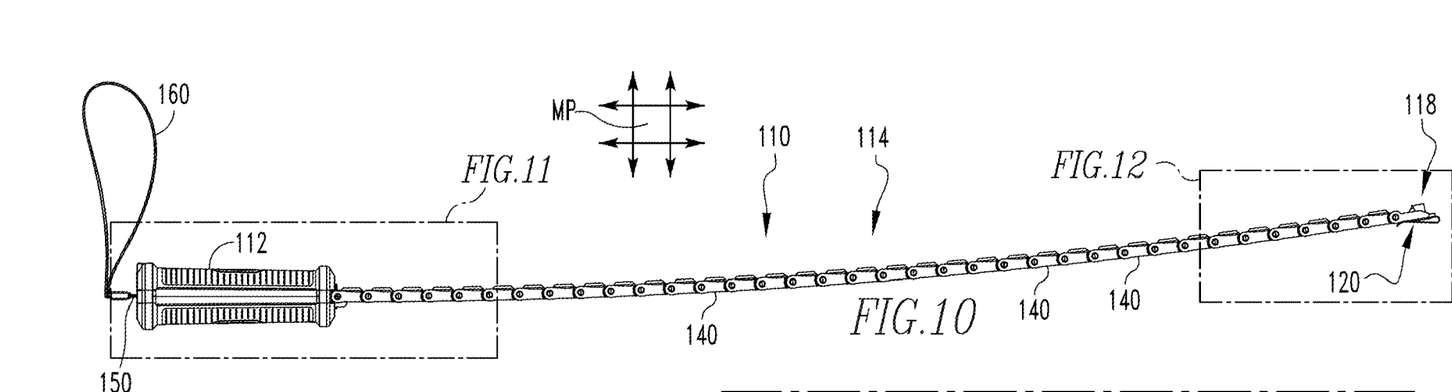
FIG. 10 is a side view of the apparatus of FIG. 4.
Figures 11, 12:
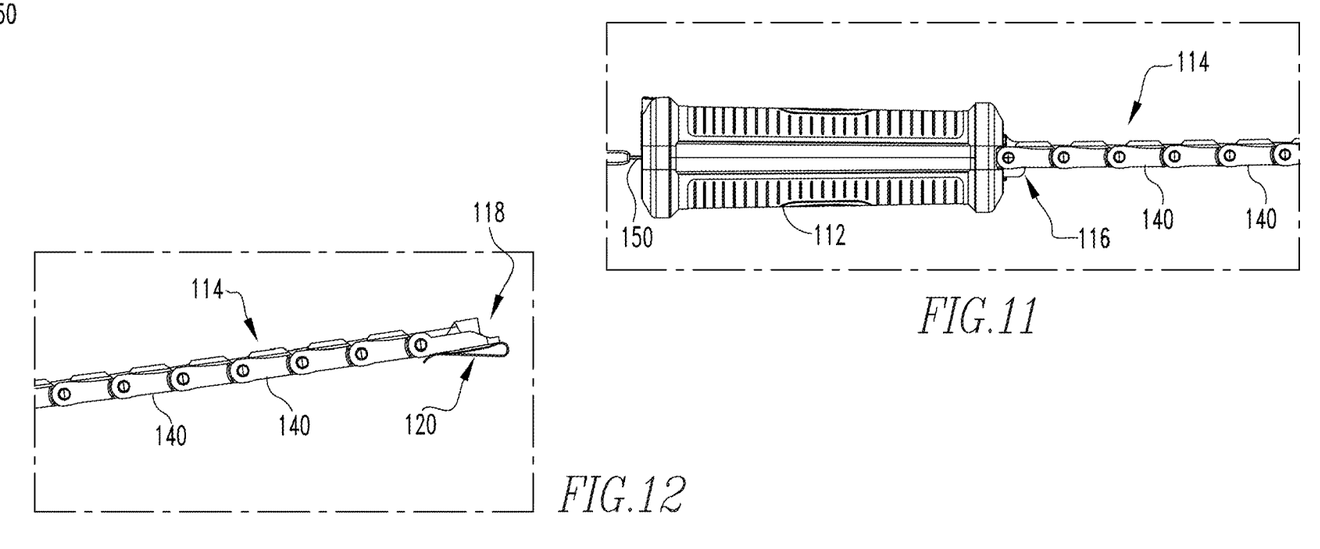
FIGS. 11 and 12 are detail views of the portions of the apparatus of FIG. 10 indicated therein.

Arm portion 14 is sized and configured so as to be positioned in an elongated positioning, such as generally shown in FIGS. 1A and 1B, in which arm portion 14 extends away from handle portion 12 (e.g., in a linear or arc-like manner). Arm portion 14 is structured so as to be moveable in a predetermined manner or manners within a single plane, referred to hereinafter as the "movement plane MP", and shown schematically in the figures. In the views of FIGS. 1B, 2B and 3B such movement plane corresponds+ to the plane of the page. FIGS. 2A and 2B show a more compact, retracted positioning of arm portion 14 within the aforementioned movement plane in which arm portion 14 may be positioned as an alternative to the extended positioning shown in FIGS. 1A and 1B. In such retracted positioning, arm portion 14 is rolled in a coiled/spiral-like manner adjacent first end 16 thereof and handle portion 12. In some example embodiments, arm portion 14 is structured so as to be stable while in, and readily movable between, such extended and retracted positionings, and generally unstable when outside of such positionings. In other words, arm portion could generally be left in either of the positionings shown in either of FIGS. 1A and 2A and would remain in either of such positionings without the need of an outside force to remain in either of such positionings. Meanwhile, if moved from either of such positionings (e.g., via an outside force) arm member 14 would return to one or the other of such positionings (typically the retracted positioning) upon removal of the outside force.

In some example embodiments in accordance with the present invention, such as shown schematically in FIGS. 1A, 1B, 2A, 2B, 3A and 3B, arm portion 14 is formed as a single integral member that extends from first end 16 to second end 18. In at least one of such examples, arm portion 14 is formed from a bi-stable strip of material, formed from metallic or composite materials (e.g., a bi-stable metallic or composite spring). Accordingly, in such example wherein a bi-stable spring material is employed for arm portion 14, FIGS. 1A and 1B illustrate wherein such material has been effectively "snapped" into a straightened position, and FIGS. 2A and 2B would illustrate wherein the material has been "snapped" out of the straightened position and thus rolls/coils back on itself. In some other example embodiments in accordance with the present invention, an example of which is discussed below, arm portion 14 may be formed from multiple members moveably coupled together so as to be movable in a predetermined manner with respect to each other that provides for similar functionality.

Having thus described the general components of apparatus 10 and positionability of arm portion 14 thereof, use of apparatus 10 in positioning strap 24 about an object 26, e.g., without limitation, a tree trunk, utility pole, or other suitable structure or object, will now be described in conjunction with FIGS. 3A and 3B. Referring first to FIG. 3A, as an initial step, portion 22 (preferably at or near an end) of strap 24 is coupled to second end 18 of arm portion 14 via coupling mechanism 20 while the other end (not numbered) is coupled to a belt of the user, a tree stand, or any other appropriate/suitable location depending on the particular application.

Depending on the particular arrangement of coupling mechanism 20, such coupling may be made when arm portion 14 is positioned in the retracted or extended positionings previously discussed. If the coupling with portion 22 of strap 24 is made when arm portion 14 is positioned in the extended positioning, such as shown in FIGS. 1A and 1B, apparatus 10 is next positioned with arm portion 14 along a side of object 26, such as generally shown in FIG. 3A, such that handle portion 12 is positioned generally near object 26 and second end 18 of arm portion 14 is positioned a distance d beyond a far side 30 of object 26 opposite a near side 32 of object 26 by which a user (not shown) would be positioned grasping handle portion 12. Alternatively, if the coupling with portion 22 of strap 24 is made when arm portion 14 is positioned in the retracted positioning, similar to shown in FIGS. 2A and 2B, arm portion 14 is moved to the extended positioning prior to apparatus 10 being positioned with arm portion 14 along the side of object 26, such as generally shown in FIG. 3A.

After being positioned as generally shown in FIG. 3A, arm portion 14 is then caused to move within the movement plane from the elongated positioning along object 26, such as shown in FIG. 3A to a further, wrapped positioning wherein arm portion 14 wraps at least partially around object 26, such as shown in the top view of FIG. 3B. Preferably, arm portion 14 wraps at least 180° around object 26, thus positioning second end 18 of arm portion 14 along with portion 22 of strap 24 in ready reach of a user of apparatus 10 positioned adjacent near side 32 of object 26. In an example embodiment of the present invention, such movement from the extended positioning to the wrapped positioning is accomplished by slapping the wider face of arm portion 14 on the adjacent side (not numbered) of object 26. In other embodiments of the present invention one or more further elements may be provided that assist in moving arm portion 14 from the elongated positioning to the wrapped positioning and/or vice-versa. Once in such wrapped positioning, portion 22 of strap 24 is easily uncoupled from second end 18 of arm portion 14 and secured as appropriate for the particular application. Apparatus 10 may then be pulled from the wrapped positioning around object 26 and returned to the extended positioning, or more preferably the compact, retracted positioning of FIGS. 2A and 2B for easy transport/storage.

From such example it can readily be appreciated that the ability of arm portion 14 to effectively wrap at least 180° around a circular or generally circular object, arm portion 14 must have an overall length of at least one half diameter of the object multiplied by π (i.e., one half the circumference of the object). Accordingly, for example, without limitation, an arm portion 14 having an overall length of 3 feet (i.e., 36 inches) can sufficiently wrap around an object having a diameter of up to about 2 feet. Whereas an arm portion 14 having an overall length of about 4 feet (i.e., 48 inches) can sufficiently wrap around an object having a diameter of up to about 32 inches. It is thus also to be appreciated that the overall length of arm portion 14 may be varied without varying from the scope of the present invention in order to sufficiently handle particular applications.

Figure 13:
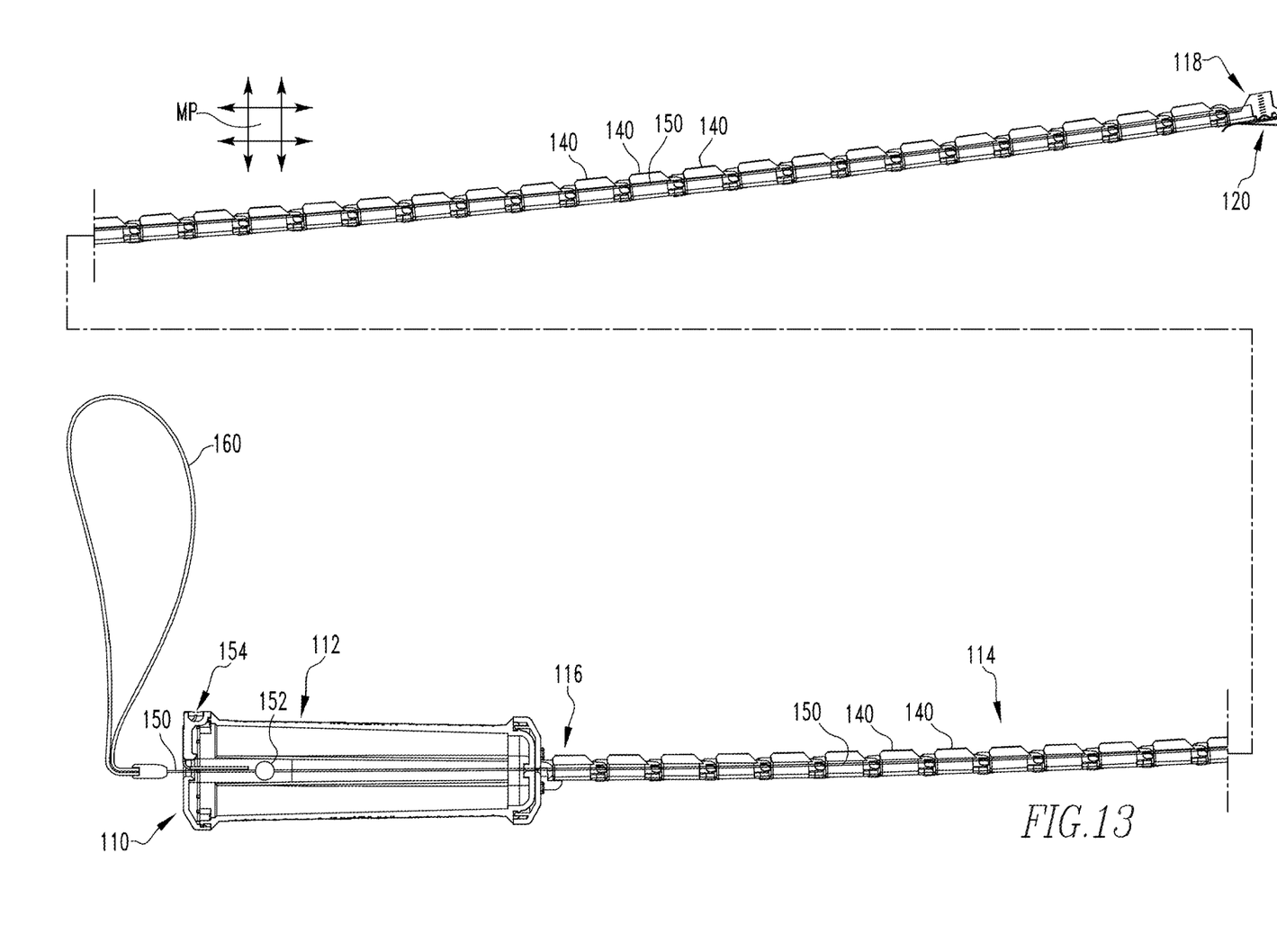
FIG. 13 is a sectional view of the apparatus of FIG. 4 cut along a mid-plane of the apparatus as indicated in FIG. 7.
Figure 14:
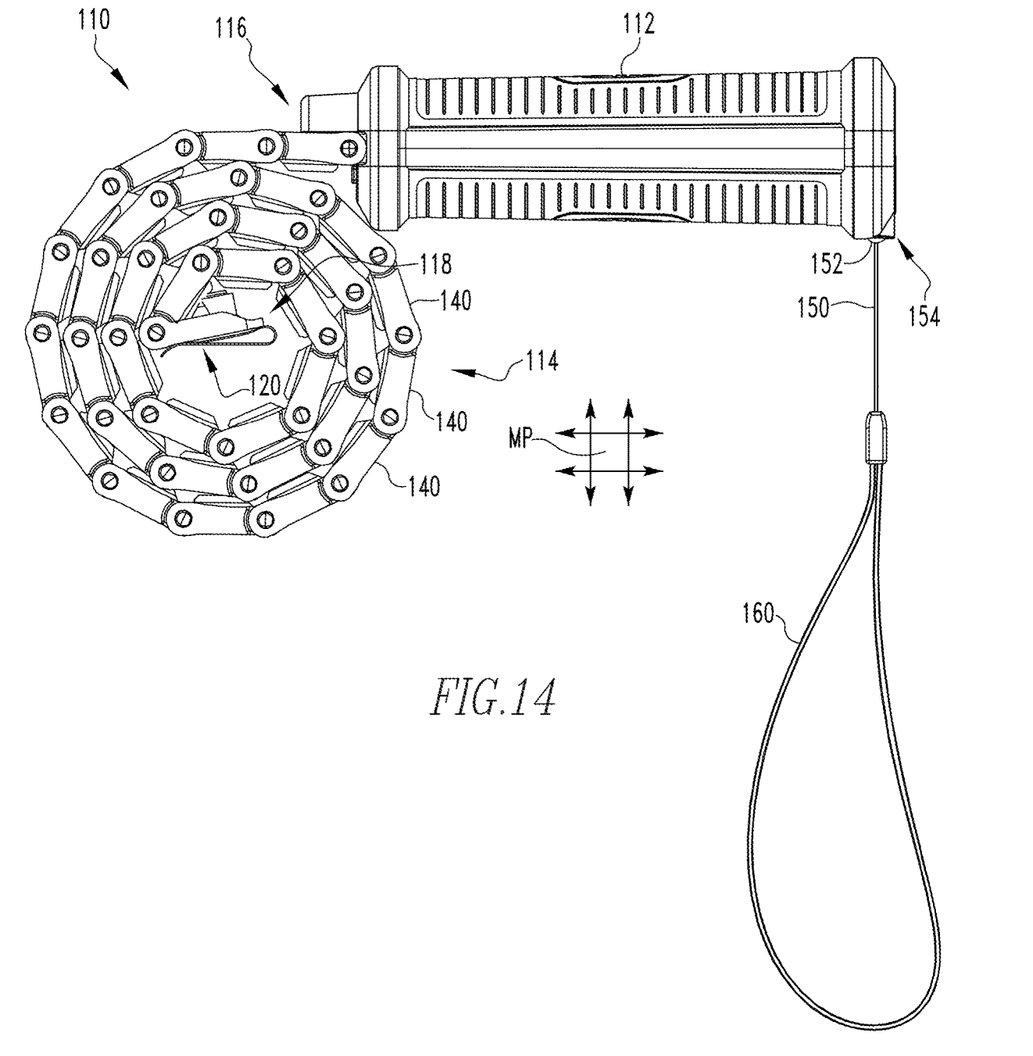
FIG. 14 is another side view of the apparatus of FIGS. 4-13 shown with the arm portion thereof positioned in a second, retracted positioning in accordance with one example embodiment of the present invention.
Figure 15:
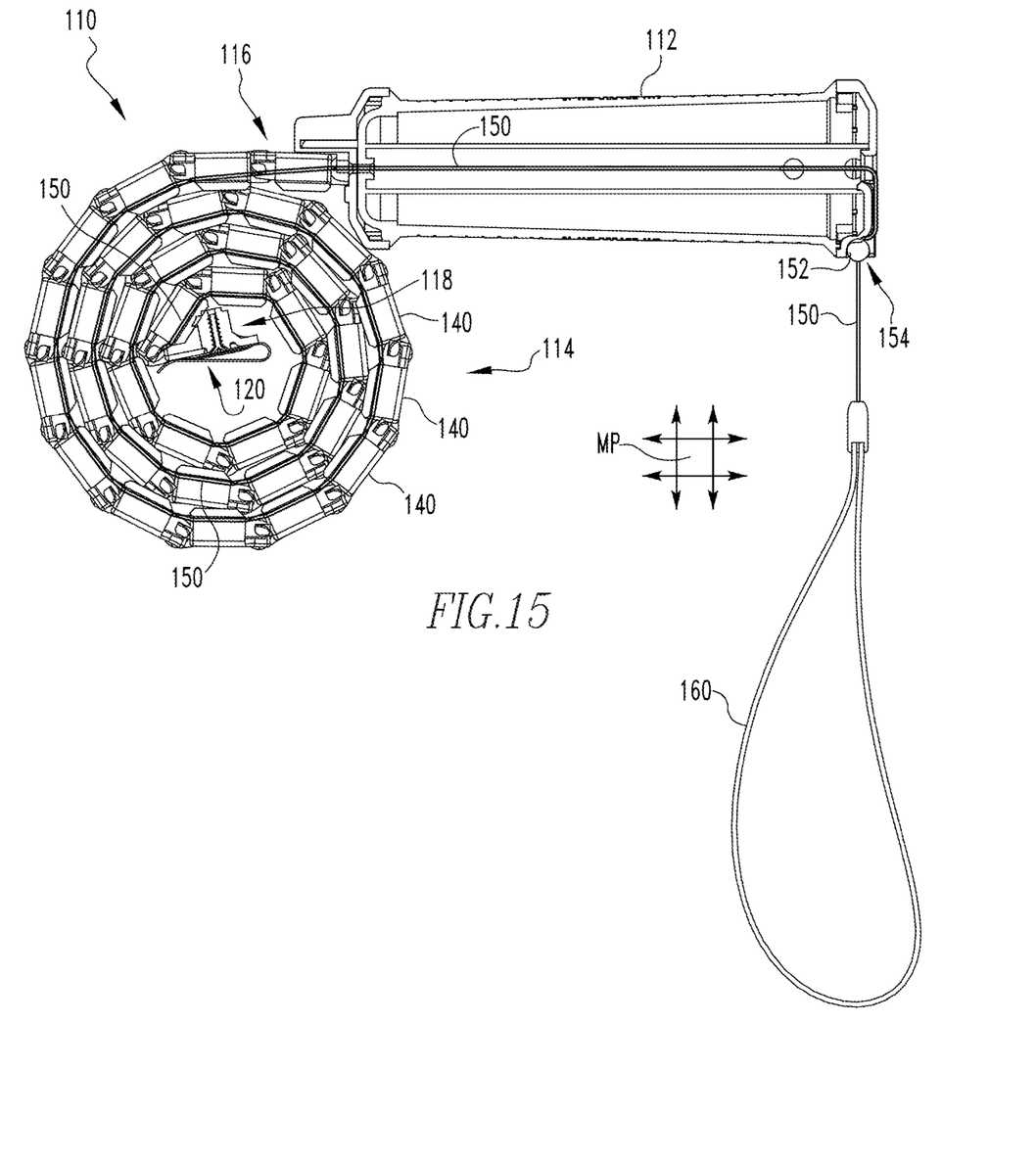
FIG. 15 is a sectional view of the apparatus of FIG. 14 cut along a mid-plane of the apparatus similar to FIG. 13.
Figure 16:
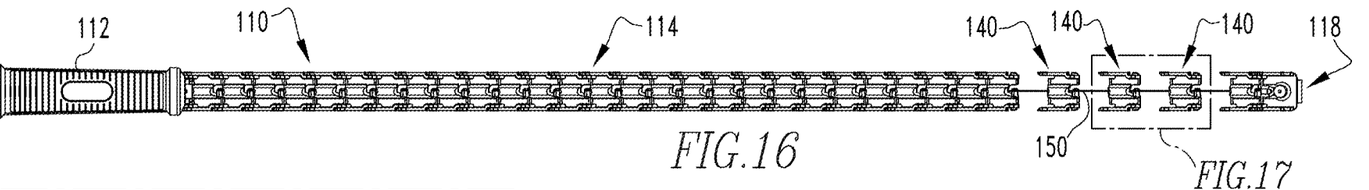
FIG. 16 is another top view, similar to that of FIG. 7, of the apparatus of FIG. 4, except shown with some segments of the arm portion near the second end thereof shown exploded from each other.
Figure 17:
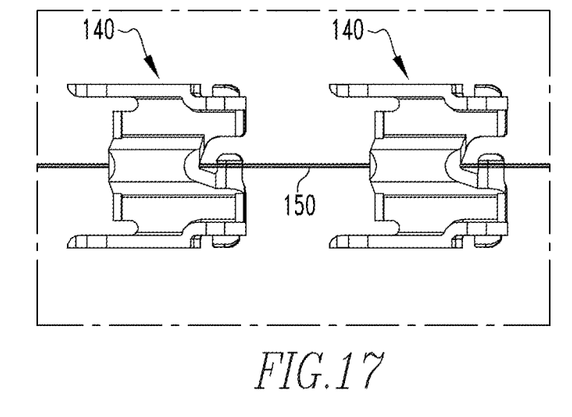
FIG. 17 is a detail view of the portion of FIG. 16 indicated therein.
Figure 18:
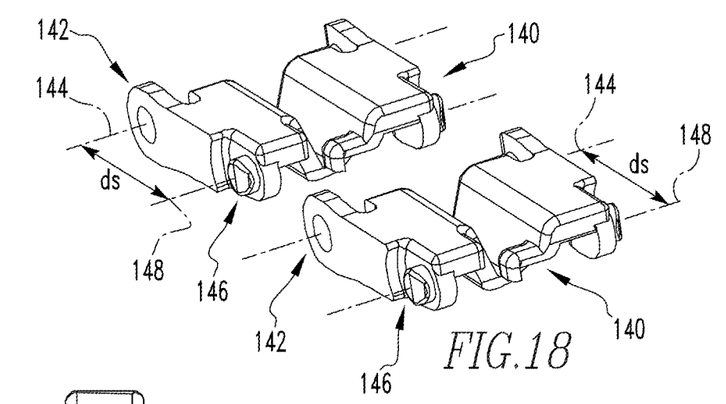
FIG. 18 is a perspective view of the bottom of the exploded segments of the detail view of FIG. 17.
Figure 19:
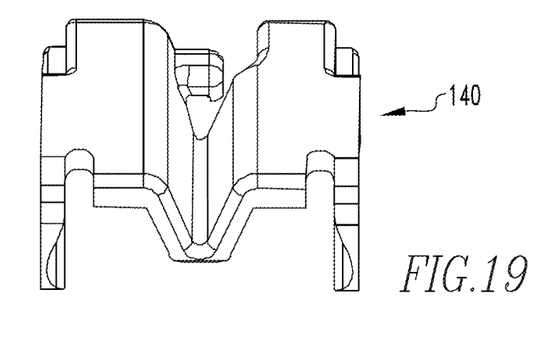
FIG. 19 is a perspective view of the bottom of one of the segments of FIGS. 16-18.

Numerous views of another example apparatus 110 and portions thereof in accordance with another example embodiment of the present invention are shown in FIGS. 4-19. Apparatus 110 generally functions and is used in a similar manner as apparatus 10 and as such includes several similar elements. Like apparatus 10, previously discussed, apparatus 110 similarly includes a handle portion 112 that is sized and configured to be grasped in the hand of a user (not shown) and an arm portion 114 extending from handle portion 112. Arm portion 114 includes a first end 116 coupled to handle portion 112 and an opposite second end 118 having a coupling mechanism 120 coupled there or about. In general, each of the aforementioned elements of apparatus 110 function in a similar manner as the corresponding elements of apparatus 10. However, unlike arm portion 14 of apparatus 10 that was formed of a single member, arm portion 114 of apparatus 110 includes a plurality of links or segments 140 that are moveably coupled to each other. More particularly in such example embodiment segments 140 are pivotably coupled together in a series arrangement, wherein each segment 140 is coupled to a preceding segment 140 (i.e., the adjacent segment 140 closer to handle portion 112) by a first pivotable coupling 142 arranged about a first pivot axis 144 (FIGS. 5, 9 and 18), wherein each segment 140 is coupled to a proceeding segment 140 (i.e., the adjacent segment 140 further from handle portion 112) by a second pivotable coupling arranged 146 about a second pivot axis 148 (FIGS. 5, 9 and 18) that is spaced a distance ds (FIGS. 5, 9 and 18) from first pivot axis 144. It is to be appreciated that in such arrangement the first pivot axis 144 of a given segment 140 coincides with the second pivot axis 148 of the preceding segment 140 and the second pivot axis 148 of a given segment 140 coincides with the first pivot axis 144 of a proceeding segment 140. It is to be appreciated that such arrangement of pivotable connections allows movement of segments 140, and thus arm portion 114, but only within the movement plane MP indicated in the Figures similar to arm portion 14 previously discussed. Accordingly, arm portion 114 is movable among an extended positioning, such as shown in FIGS. 4-13, wherein arm portion 114 is generally straight or arcuate in shape, and a retracted positioning wherein arm portion 114 is rolled back (e.g., in a spiral-like manner) adjacent handle portion 112, such as shown in FIGS. 14 and 15.

Segments 140 may be formed from any suitable material or materials (e.g., without limitation, plastic, composite, metal, etc.) without varying from the scope of the present invention. The sizing of segments 140 may be varied without varying from the scope of the present invention. In some example embodiments of the present invention, the distance ds between first and second pivot axis 144 and 148 of each segment 140 is the same for all of segments 140 in arm portion 114. In one of such examples a distance ds of 1 inch was used. In other example embodiments of the present invention, arm portion 114 is formed from segments 144 having at least two different distances ds between first and second pivot axis 144 and 148. In one of such examples, segments 140 having a distance ds of 2 inches between first and second pivot axis 144 and 148 were used in conjunction with other segments 140 having a distance ds of 1 inch between first and second pivot axis 144 and 148, with the segments 140 having the longer distance ds being positioned is series near handle portion 112 and segments 140 having the shorter distance ds being positioned in series near second end 118 of arm portion 114. Accordingly, it is to be appreciated that one or more of the material(s) used, size, and or quantity of segments 140 used to form arm portion 114 may be varied without varying from the scope of the present invention.

One or more of segments 140 may be constructed so as to interact with handle portion 112 and/or one or more other segment(s) 140 in a manner or manners that restrict movement of one or more segments 140 further within movement plane MP. For example, in the view of apparatus 110 shown in FIG. 10 in which the movement plane MP coincides with the plane of the Figure, movement of second end 118 downward (relative to the orientation shown in FIG. 10) relative to a fixed handle portion 112 (e.g., such as being firmly grasped by a user) may be limited due to interactions between segments 140 of arm portion 114 such that arm portion 114 is slightly arcuate in shape when positioned in the maximum extended position as shown (as opposed to being perfectly linear). In such arrangement, upward movement of second end 118 of arm portion 114 is not restricted, hence arm portion 114 can readily move to the retracted positioning such as shown in FIGS. 14 and 15 and/or a wrapped positioning around an object similar to such for wrapped positioning shown for arm portion 14 in FIG. 3B.

Instead of, or in addition to, having segments 140 interact in a manner that further limits/restricts movement of arm portion 114 within the movement plane MP, one or more additional elements may be provided that limit and or otherwise affect movement of arm portion 114. For example, as shown in the sectional views of FIGS. 13 and 15, apparatus 110 includes a retraction cord 150 having a first end (not numbered) that is coupled at or about second end 118 of arm portion 114 and an opposite second end that, in the example embodiments shown, is in the form of a wrist loop 160 that is sized and configured to be looped around (i.e., encircle) the wrist of a user of apparatus 110. As can be seen from such sectional views, retraction cord 150 extends along, and interacts with the plurality of segments 140 in a manner such that when retraction cord is tensioned by a user pulling on the second end thereof, arm portion 114 is caused to generally roll up on itself beginning from second end 118 and thus is moved from the extended positioning, such as shown in FIG. 13, to the spiral-shaped retracted positioning, such as shown in FIG. 15. In the example shown in FIGS. 13 and 15, retraction cord 150 extends generally through the plurality of segments 140, however, it is to be appreciated that retraction cord may instead be positioned so as to generally interact with an outer surface of segments 140 without varying from the scope of the present invention. Once arm portion 114 is retracted using retraction cord 150, retraction cord 150 may generally be locked/fixed in place to keep arm portion 114 in the retracted positioning. In the illustrated example, such locking/fixing of retraction cord 150 is accomplished with a spherical member 152 (FIGS. 13-15) positioned on, and fixed with respect to, retraction cord 150 and a cooperatively sized portion 154 (FIGS. 13-15) of handle portion 112. Spherical member 152 can be selectively positioned in portion 154 to generally lock arm portion 114 in the retracted positioning, such as shown in FIGS. 14 and 15, or removed therefrom to allow arm portion 114 to move to the extended positioning, such as shown in FIG. 13. It is to be appreciated that other arrangements for selectively fixing/locking retraction cord 150 with respect to handle portion 150 may be employed without varying from the scope of the present invention.

It is to be appreciated that apparatus 110 is employed by a user in positioning a strap in generally the same manner as apparatus 10, such as previously discussed in conjunction with FIGS. 3A and 3B, and thus a repeat of such discussion is not provided. A distinction from operation of apparatus 10 is that prior to, and after use of apparatus 110, arm portion 114 would be unlocked and locked from the retracted positioning as previously described.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

What is claimed is:

1. An apparatus for positioning a strap around an object, the apparatus comprising:
    a handle portion sized and configured to be grasped by a user of the apparatus;
    an arm portion having a first end and an opposite second end, the first end being coupled to the handle portion; and
    a coupling mechanism coupled at or near the second end of the arm portion, the coupling mechanism being structured to selectively couple a portion of the strap to the second end of the arm portion,
    wherein, when the handle portion is grasped by the user of the apparatus adjacent a side of the object, the arm portion is sized and configured to be movable among:
        a first positioning wherein the arm portion extends outward from the handle and the user such that the second end of the arm portion extends a distance beyond a far side of the object,
        a second positioning wherein the arm portion wraps at least partially around the object,
    wherein the arm portion comprises a single integral member that extends from the first end to the opposite second end of the arm portion, and wherein the integral member comprises a strip of bi-stable material.

2. The apparatus of claim 1, wherein when in the second positioning the arm portion wraps at least 180° around the object.

3. The apparatus of claim 1, wherein the arm portion is movable among a third positioning wherein the arm portion is rolled back toward the handle portion in a spiral-like positioning adjacent the handle.

4. The apparatus of claim 1, wherein the object is a portion of a tree, and wherein the arm portion is sized and configured to be disposed in the second positioning about the tree.

5. The apparatus of claim 1, wherein the coupling mechanism comprises a spring biased clamping arrangement.

6. The apparatus of claim 1, wherein the coupling mechanism comprises a single u-shaped piece of flexible material.

7. A method of positioning a strap around an object using an apparatus comprising: a handle portion sized and configured to be grasped by a user of the apparatus; an arm portion having a first end and an opposite second end, the first end being coupled to the handle portion; and a coupling mechanism coupled at or near the second end of the arm portion, wherein, when the handle portion is grasped by the user of the apparatus adjacent a side of the object, the arm portion is sized and configured to be movable among: a first positioning wherein the arm portion extends outward from the handle and the user such that the second end of the arm portion extends a distance beyond a far side of the object, and a second positioning wherein the arm portion wraps at least partially around the object, the method comprising:
    coupling a portion of the strap to the second end of the arm portion via the coupling mechanism;
    moving the arm portion to the first positioning if not already in such positioning prior to coupling the portion of the strap;
    positioning the arm portion adjacent the side of the object;
    moving the arm portion from the first positioning to the second positioning; and
    uncoupling the portion of the strap from the second end of the arm portion.

8. The method of claim 7, wherein the arm portion is movable among a third positioning wherein the arm portion is rolled back toward the handle portion in a spiral-like positioning adjacent the handle, and wherein the method further comprises:
    moving the arm member from the third positioning to the first positioning prior to coupling the portion of the strap to the second end of the arm portion via the coupling mechanism.

9. The method of claim 7, wherein the arm portion is movable among a third positioning wherein the arm portion is rolled back toward the handle portion in a spiral-like positioning adjacent the handle, and wherein the method further comprises moving the arm member from the second positioning to the third positioning after uncoupling the portion of the strap from the second end of the arm portion.

10. The method of claim 9, wherein the apparatus further comprises a retraction cord having a first end coupled at or about the second end of the arm portion and an opposite second end, and wherein moving the arm member from the second positioning to the third positioning after uncoupling the portion of the strap from the second end of the arm portion comprises pulling the second end of the cord.

* * * * *